United States Patent [19]
Heck

[11] Patent Number: 5,709,601
[45] Date of Patent: Jan. 20, 1998

[54] DASHBOARD ASSEMBLY

[75] Inventor: Thomas Heck, Mainz, Germany

[73] Assignee: Delphi Automotive Systems Deutschland GmbH, Wuppertal, Germany

[21] Appl. No.: 664,723

[22] Filed: Jun. 16, 1996

[51] Int. Cl.⁶ .................................................. B60H 1/26
[52] U.S. Cl. ........................ 454/121; 296/70; 454/127
[58] Field of Search ................................. 454/121, 124, 454/127; 180/90; 296/70

[56] References Cited

U.S. PATENT DOCUMENTS

| | | | |
|---|---|---|---|
| 4,223,754 | 9/1980 | Mizuno et al. | 454/127 X |
| 4,559,888 | 12/1985 | Nonaka et al. | 454/127 |
| 4,597,461 | 7/1986 | Kochy et al. | 180/90 |
| 4,693,416 | 9/1987 | Hayakawa | 454/127 |
| 4,733,739 | 3/1988 | Lorenz et al. | 180/90 |
| 5,265,668 | 11/1993 | Fisher . | |
| 5,556,153 | 9/1996 | Kelman et al. | 296/70 |
| 5,564,515 | 10/1996 | Schambre | 454/127 |
| 5,619,862 | 4/1997 | Ruger et al. . | |

FOREIGN PATENT DOCUMENTS

| | | | |
|---|---|---|---|
| 0 456 531 | 11/1991 | European Pat. Off. | 296/70 |
| 0607585 | 7/1994 | European Pat. Off. | 296/70 |
| 38 18 666 | 12/1988 | Germany | 454/127 |

*Primary Examiner*—Harold Joyce
*Attorney, Agent, or Firm*—Patrick M. Griffin

[57] ABSTRACT

A dashboard assembly (10) comprising a first housing portion (12) for positioning adjacent a windscreen of a motor vehicle; a second housing portion (14) secured to the first portion; and an air blower system (16) mounted between the first and second portions, the air blower system having a blower inlet (32) and blower outlets (30, 31); one or more air outlets (20) formed in the first portion; one or more open-sided channels (42) integrally formed in the first portion or the second portion for directing air from the blower outlet to the air outlet or outlets, the open side of the channel or channels being closed on securing the first portion to the second portion; and an air inlet duct (45) for directing air to the blower inlet.

7 Claims, 6 Drawing Sheets

DASHBOARD ASSEMBLY

The present invention relates to a dashboard assembly for a motor vehicle.

BACKGROUND OF THE INVENTION

EP-A-0607585 describes a dashboard assembly comprising a pair of shells which are joined together to form a single transverse duct. A heat exchanger is housed in a seat formed integrally with one of the shells. The duct directs air flow output from the heat exchanger which is positioned within the duct. US-A-4733739 (EP-A-0185856) describes a dashboard assembly which is formed from a number of moulded plastics parts which are joined together. These known arrangements are complex and difficult to assemble.

SUMMARY OF THE INVENTION

It is an object of the present invention to provide an improvement to the above mentioned known arrangements.

A dashboard assembly in accordance with the present invention comprises a first housing portion for positioning adjacent a windscreen of a motor vehicle; a second housing portion secured to the first portion; and an air blower system mounted between the first and second portions, the air blower system having a blower inlet and a blower outlet; one or more air outlets formed in the first portion; one or more open-sided channels integrally formed in the first portion or the second portion for directing air from the blower outlet to the air outlet or outlets, the open side of the channel or channels being closed on securing the first portion to the second portion; and an air inlet duct for directing air to the blower inlet.

The present invention has particular application where the first and second housing portions are moulded from plastics material, preferably by injection moulding. The open-sided channel(s) are preferably integrally formed in the first portion or the second portion during the moulding process. The first and second portions can be secured together by ultrasonic or vibration welding, or any other suitable means. On securing, the open side of the or each channel is closed by the other portion to define air ducts for the flow of air from the air blower system. The air blower system is part of the ventilation system for the motor vehicle. The air blower system preferably includes a heat exchanger, and may be part of an air conditioning system for the motor vehicle. The air blower system may be attached to the first housing portion before the first and second portions are secured together, or the air blower system may be attached to the second housing portion before the first and second portions are secured together. The air blower system preferably includes an open-sided housing, the open side being closed on attaching the air blower system to the first portion or the second portion. The air blower system housing is preferably (injection) moulded from plastics material, and preferably secured to the moulded plastics first or second portions by ultrasonic welding or any other suitable means.

The air inlet duct is preferably integrally formed in the first portion or the second portion, or in the blower system housing, during the moulding process, where such a process is used.

Manually or electrically operable flap valves are preferably positioned in the air blower system prior to securing the air blower system to the first portion or the second portion.

DESCRIPTION OF THE PREFERRED EMBODIMENT

The present invention will now be described, by way of example, with reference to the accompanying drawings, in which.

Figure 1:
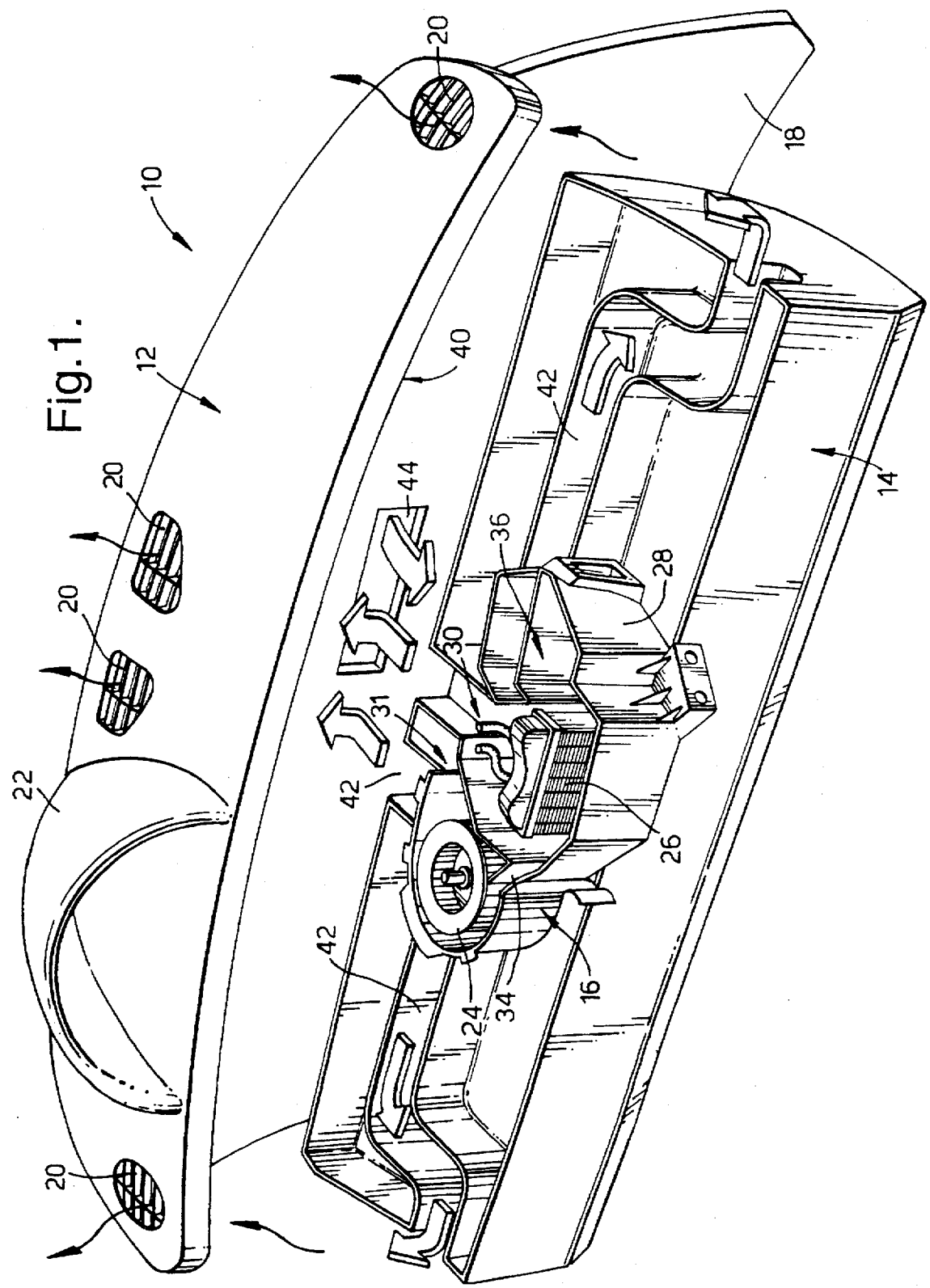
FIG. 1 is an exploded view of a dashboard assembly in accordance with the present invention.
Figure 2:
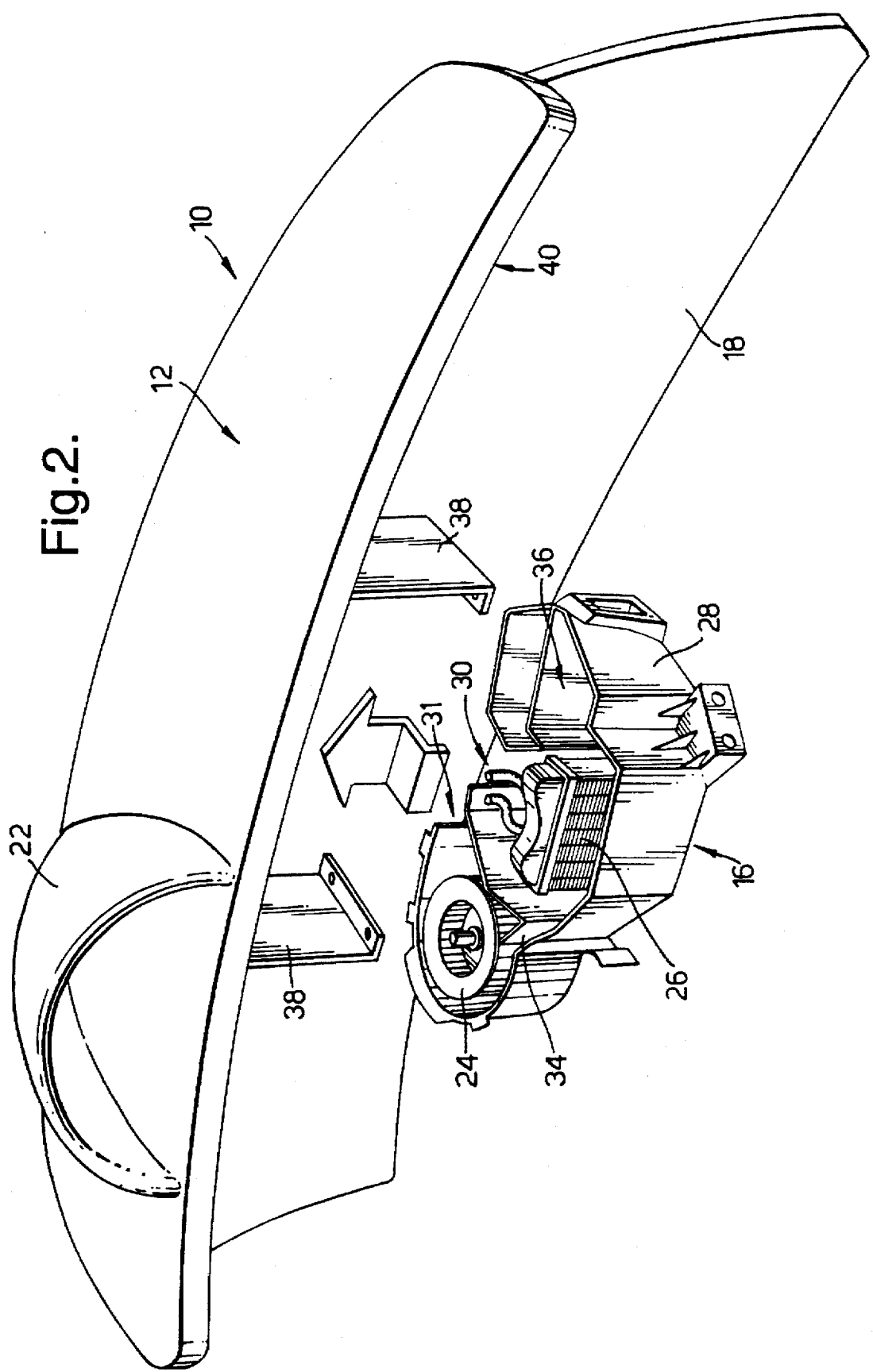
FIG. 2 is an exploded view of the first housing portion and the air blower system of the dashboard assembly of FIG. 1.
Figure 3:
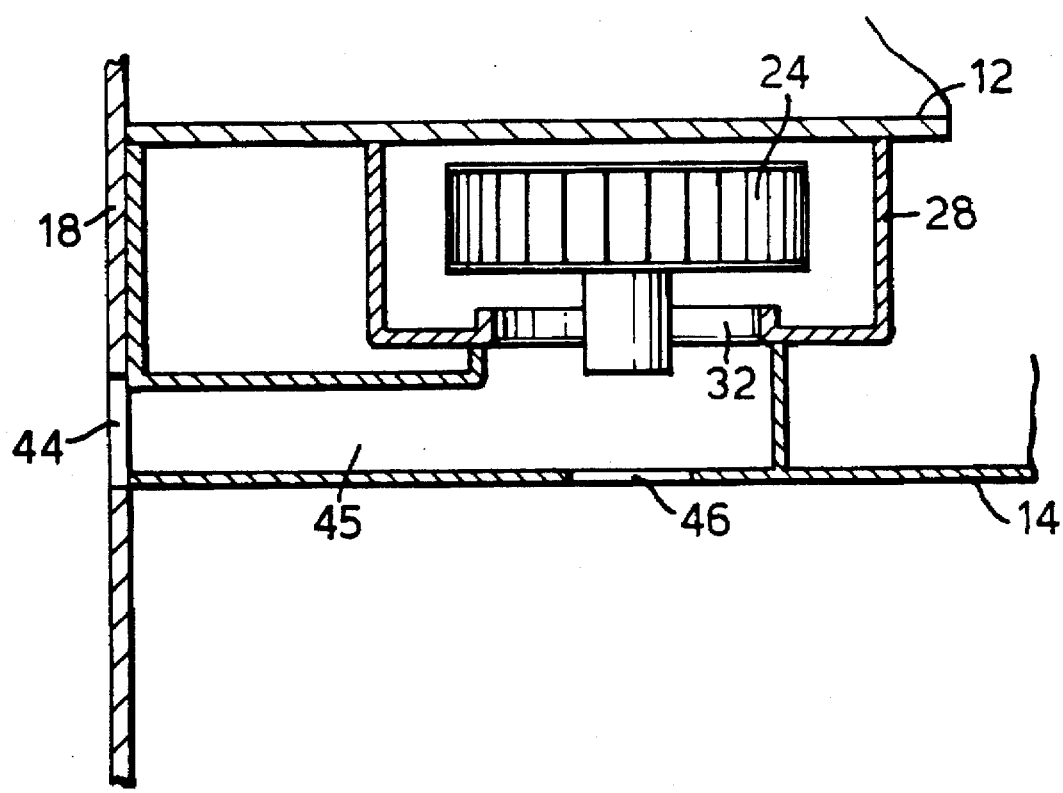
FIG. 3 is a cross-sectional view of the second housing portion and the air blower system showing the blower inlet.

Referring to FIGS. 1 to 3 of the drawings, the dashboard assembly 10 comprises a first or upper housing portion 12, a second or lower housing portion 14, and an air blower system 16. The upper portion 12 is mounted in a motor vehicle adjacent the base of the front windscreen of the vehicle and the upper edge of the firewall 18 which separates the engine compartment of the vehicle from the passenger compartment, in the usual manner. The upper portion 12 has a number of air outlets 20 for directing air from the air blower system 16 onto the windscreen as indicated by the arrows in FIG. 1. The upper portion 12 preferably includes a mounting portion 22 within which instruments, gauges, and/or switches may be mounted.

The air blower system 16 comprises an electric motor (not shown) which rotates a centrifugal fan 24, a heat exchanger 26, and a housing 28. The housing 28 defines a blower inlet 32 and blower outlets 30, 31. Air enters the housing 28 by way of the inlet 32, and is pushed by the fan 24 either out of the outlet 31 or through a passage 34 to the heat exchanger 26 and then out of the outlet 30. When the fan 24 is rotated by the electric motor, this passage of air has increased speed. The housing 28 has an open top 36 which is closed by the upper portion 12 on assembly of the dashboard assembly 10. As shown in FIG. 2, the air blower system 16 is mounted on the upper portion 12 by sliding (as shown by the arrow) the air blower system into position between a pair of mounting brackets 38, and then securing the air blower system to the brackets. The open top 36 of the housing 28 is substantially closed by the lower surface 40 of the upper portion 12. The housing 28 is preferably injection moulded from plastics material. With this arrangement, the material for the housing 28 can be reduced compared to previous arrangements as no separate cover for the housing need be formed. This also provides a saving in that tools or dies for forming a cover the for the housing 28 are not required.

The lower portion 14 is preferably formed with a number of open-sided channels 42. The open sides of these channels 42 are closed by the lower surface 40 of the upper portion 12 when the lower portion 14 is secured to the upper portion. The channels 42 are connected together, and the blower outlet 30, 31 opens into the channels. On securing the upper portion 12 to the lower portion 14, the channels 42 open to the air outlets 20 in the upper portion. The channels 42 therefore act as ducts for the flow of air from the air blower system 16 to the air outlets 20. This arrangement removes the need for separately formed ducts, thereby reducing material and tooling or die costs.

An air inlet duct 45, which is preferably also formed in the lower portion 14 aligns with the blower inlet 32 on assembly of the dashboard assembly 10. The air inlet duct 45 also aligns with an opening 44 in the firewall 18 such that fresh air can pass through the air inlet duct into the air blower system 16. The air inlet duct 45 may have an opening 46 to allow recirculated air to enter the air blower system 16.

The upper and lower portions 12, 14 are preferably injection moulded from plastics material. In this case, the upper and lower portions 12, 14 are preferably secured together by ultrasonic or vibration welding.

Manually or electrically operable flap valves (not shown) may be mounted in the air blower system 16 before assembly of the dashboard assembly 10. The flap valves are used in the usual manner to control which air outlets 20 receive air and the mix of cold and heated air. Switches or other components may be secured to the lower portion 14.

Figure 4:
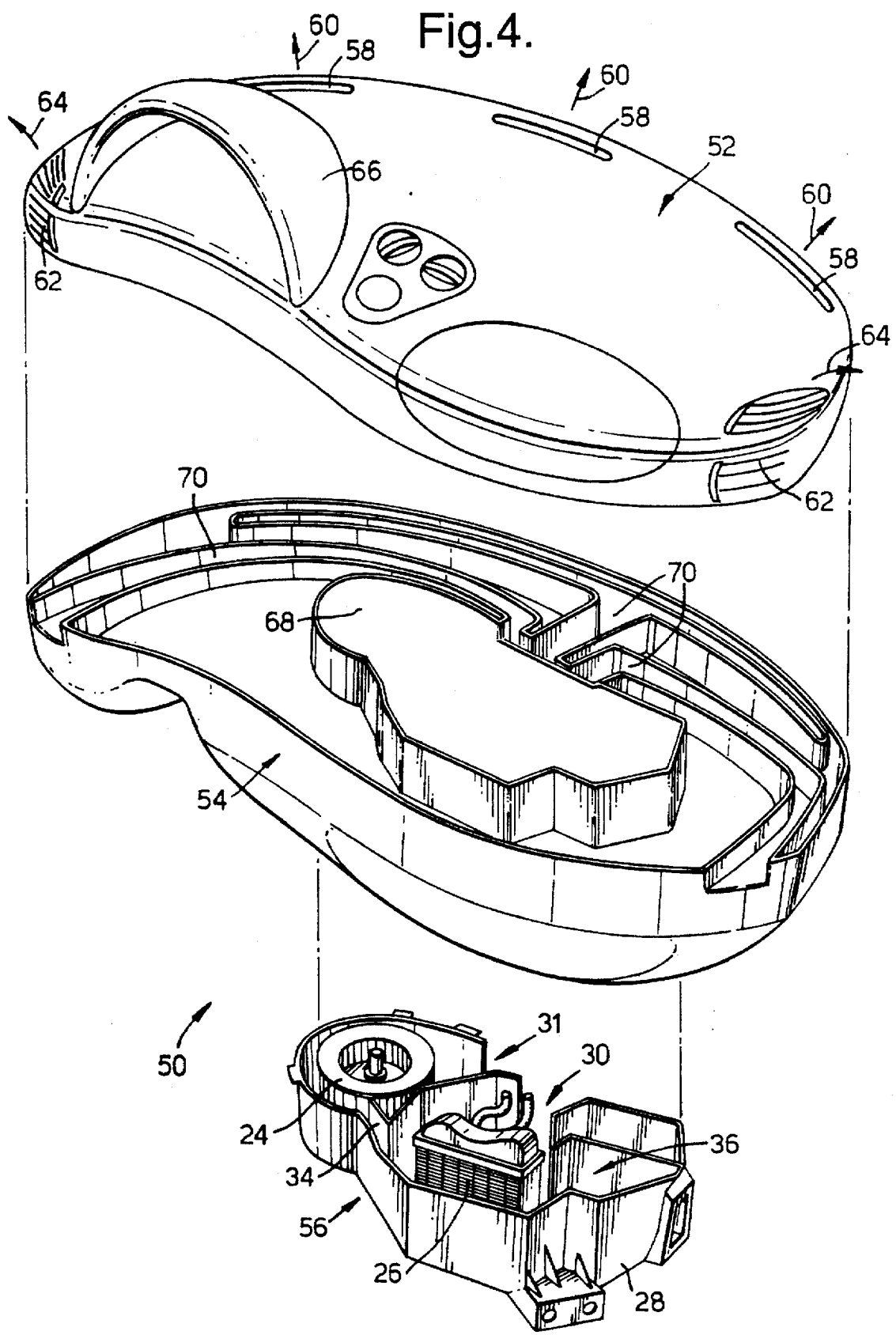
FIG. 4 is an exploded view of a second embodiment of dashboard assembly in accordance with the present invention.

Referring to FIG. 4, the second embodiment of dashboard assembly 50 shown therein comprises a first or upper housing portion 52, a second or lower housing portion 54 and an air blower system 56. The upper portion 52 has a number of air outlets 58 for directing air from the air blower system 56 onto the front windscreen (not shown) of a motor vehicle as indicated by arrows 60. The upper portion 52 also has two air outlets 62 for directing air from the air blower system 56 towards side windows (not shown) and towards the vehicle occupants as indicated by arrows 64. The upper portion 52 preferably includes a mounting portion 66 for an instrument cluster and/or switches.

The air blower system 56 is substantially the same as the air blower system 16 described above in respect of the embodiment of FIGS. 1 and 2, and like parts have been given the same reference numerals. In this arrangement, however, the housing 28 is secured in the lower portion 54 of the dashboard assembly 50 by screwing, clipping or welding. The open top 36 of the housing 28 is closed by an upper wall 68 formed as an integral part of the lower portion 54. Alternatively, upper wall 68 may be omitted, and the open top 36 of the housing 28 may be closed by the upper housing portion 52 on securing the upper portion to the lower portion 54.

The lower portion 54 is formed with a number of open-sided channels 70. The open sides of these channels 70 are closed by the lower surface of the upper portion 52 when the upper portion is secured to the lower portion 54. The channels 70 receive air from the blower outlet 30. On securing the lower portion 54 to the upper portion 52, the channels 70 open to the air outlets 58,62 in the upper portion. The channels 70 therefore act as ducts for the flow of air from the air blower system 56 to the air outlets 58,62.

An air inlet duct (not shown) in the housing 28 provides air to the blower inlet (not shown). The upper portion 52, lower portion 54 and the housing 28 are preferably formed by injection moulding of a suitable plastics material and connected together by ultrasonic welding.

Figure 5:
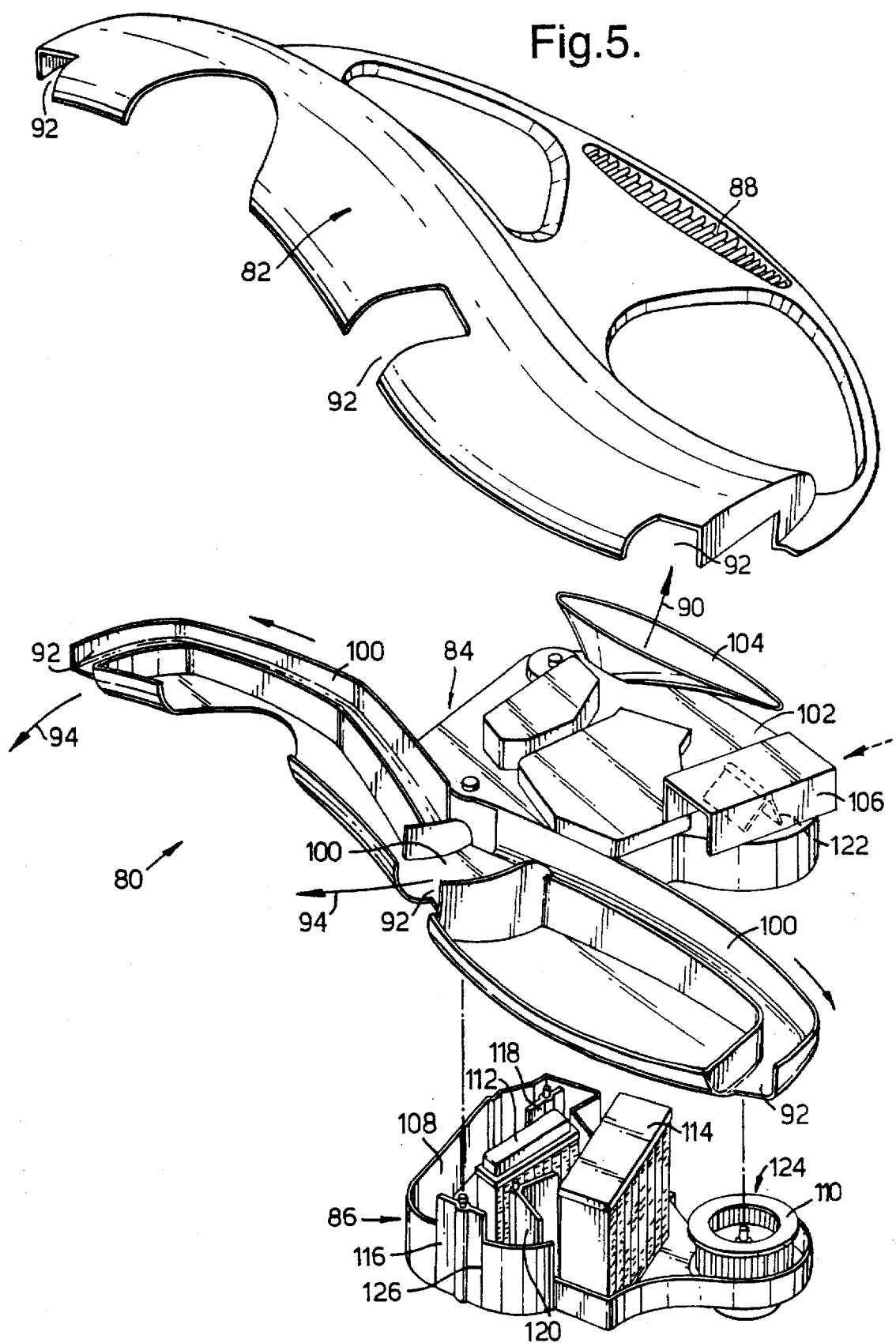
FIG. 5 is an exploded view of a third embodiment of dashboard assembly in accordance with the present invention.

Referring to FIG. 5, the third embodiment of dashboard assembly 80 shown therein comprises a first or upper housing portion 82, a second or lower housing portion 84 and an air blower system 86. The upper portion 82 has a single air outlet 88 for directing air from the air blower system 86 onto the front windscreen (not shown) of a motor vehicle as indicated by arrow 90. The upper portion 82 in combination with the lower portion 84 also has air outlets 92 for directing air from the air blower system 86 towards side windows (not shown) and towards the vehicle occupants as indicated by arrows 94.

The lower portion 84 is formed with a number of open-sided channels 100. The open sides of these channels 100 are closed by the lower surface of the upper portion 82 when the upper portion is secured to the lower portion 84. The channels 100 receive air from a blower outlet (as described below). On securing the lower portion 84 to the upper portion 82, the channels 100 open to the air outlets 92. The channels 100 therefore act as ducts for the flow of air from the air blower system 86 to the air outlets 92. The lower portion 84 also includes an upper housing portion 102 for the air blower system 86, a duct 104 for directing air from the air blower system to the air outlet 88 in the upper portion 82 when the upper portion is secured to the lower portion, and an air inlet duct 106 for the air blower system. The upper housing portion 102, duct 104 and air inlet duct 106 are preferably integrally formed with the other portions of the lower portion 84.

The air blower system 86 comprises a lower housing portion 108 which mates with, is secured to, and is closed by, the upper housing portion 102 on assembly of the dashboard assembly 80. Mounted in the lower housing portion 108 is an electric motor (not shown) which rotates a centrifugal fan 110, a heat exchanger 112, an air conditioning cooler 114, and a number of manually or electrically operable flap valves 116,118,120. A manually or electrically operable flap valve 122 is also positioned in the air inlet duct 106 for directing air to a blower inlet 124 either from outside the vehicle or by recirculating air. Flap valve 116 controls the flow of air out of a blower outlet 126 in the air blower system 86 and into the channels 100. Flap valve 118 controls the flow of air out of the air blower system 86 and into the duct 104. Flap valve 120 controls the mix of heated/cooled air leaving the air blower system 86.

The upper portion 82, lower portion 84 and the upper and lower housing portions 102,108 are preferably formed by injection moulding of a suitable plastics material and connected together by ultrasonic welding.

Figure 6:
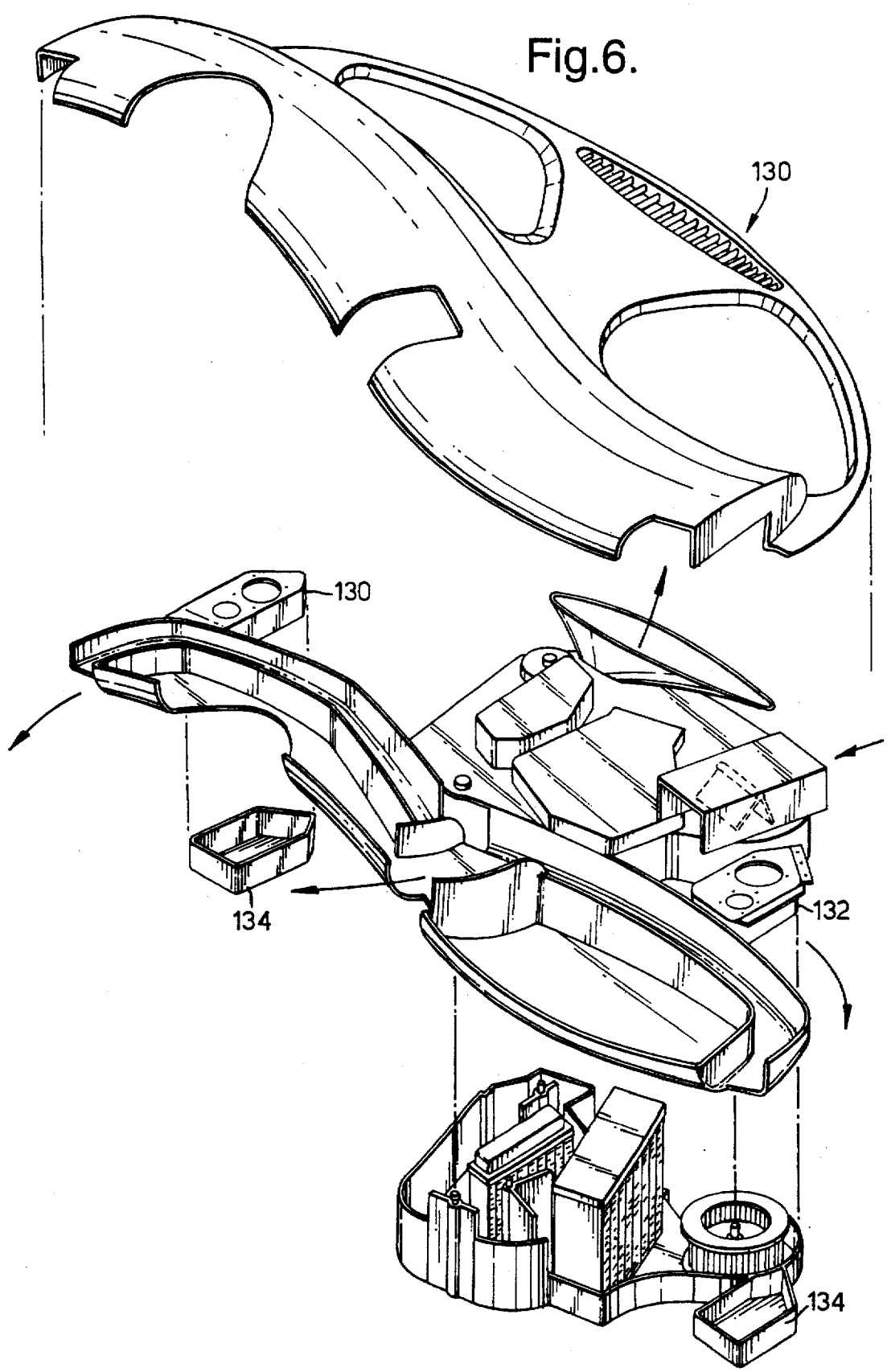
FIG. 6 is an exploded view of a fourth embodiment of dashboard assembly in accordance with the present invention.

Referring to FIG. 6, the fourth embodiment of dashboard assembly 130 is substantially the same as the third embodiment 80 described above except for the addition of housing parts 132,134 for speakers for an audio system in the motor vehicle.

A dashboard assembly in accordance with the present invention is easier to manufacture and assemble than previously known arrangements. Also, because of the reduction in material, the present invention also provides a reduction in weight over previously known designs.

I claim:

1. A dashboard assembly comprising a first housing portion for positioning adjacent a windscreen of a motor vehicle; a second housing portion secured to the first portion; and an air blower system mounted between the first and second portions, the air blower system having a blower inlet and a blower outlet; one or more air outlets formed in the first portion; one or more open-sided channels integrally formed in the first portion or the second portion for directing air from the blower outlet to the air outlet or outlets, the open side of the channel or channels being closed on securing the first portion to the second portion; and an air inlet duct for directing air to the blower inlet.

2. A dashboard assembly as claimed in claim 1, wherein the first and second housing portions are moulded from plastics material.

3. A dashboard assembly as claimed in claim 2, wherein the open-sided channels are integrally formed in the first housing portion or the second housing portion during the moulding process.

4. A dashboard assembly as claimed in claim 2 or claim 3, wherein the first and second housing portions are joined together by ultrasonic welding.

5. A dashboard assembly as claimed in any one of claims 1 to 4, wherein the air blower system comprises an open-sided housing which is closed on securing the air blower system to the first housing portion or the second housing portion.

6. A dashboard assembly as claimed in claim 5, wherein the housing of the air blower system is moulded from plastics material.

7. A dashboard assembly as claimed in claim 6, in which the first and second housing portions are moulded from plastics material, wherein the housing of the air blower system is secured to the first housing portion or the second housing portion by ultrasonic welding.

* * * * *